Figure 1:
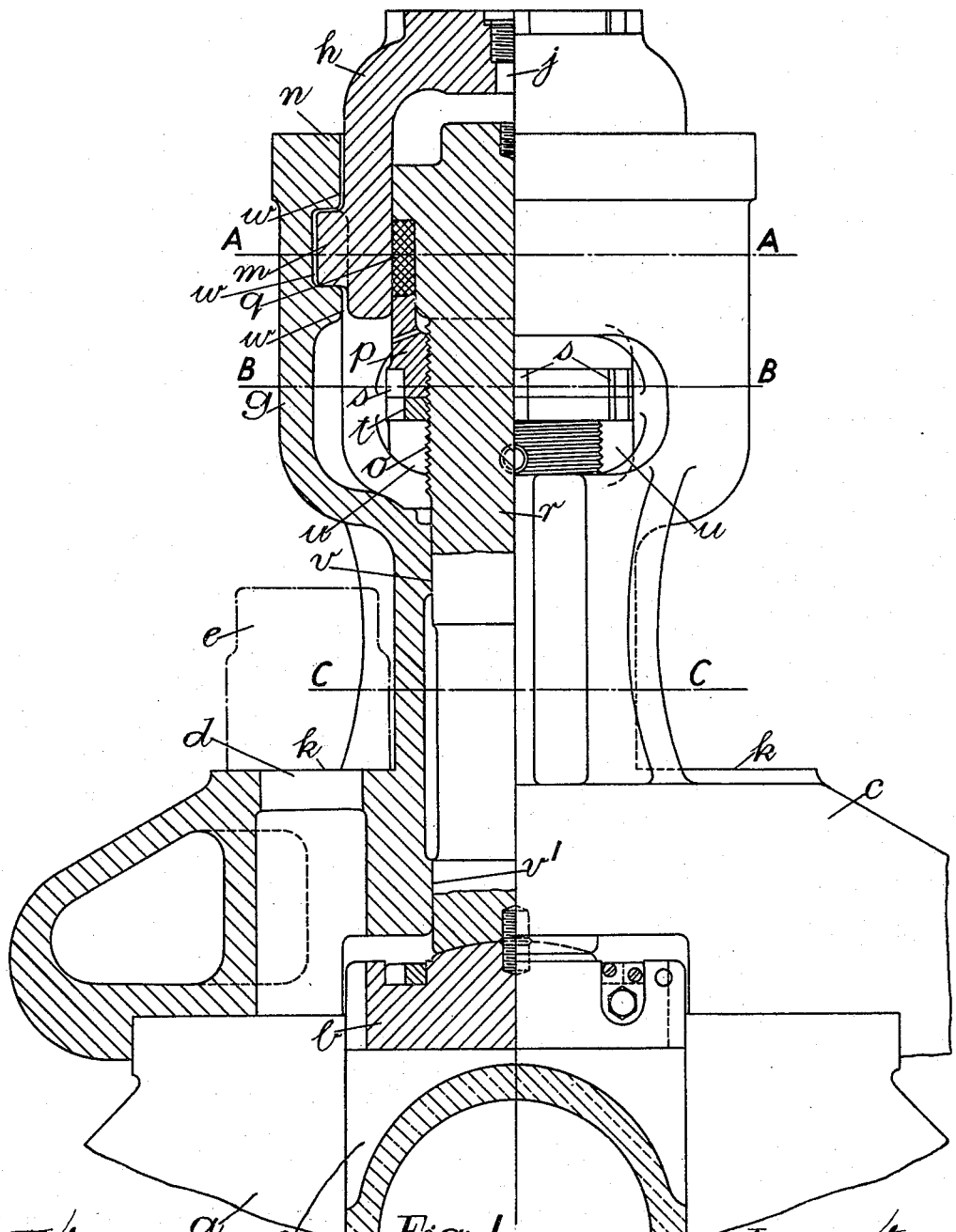

H. W. AITKEN.
PRESSURE REGULATING DEVICE FOR THE ROLLERS OF SUGAR CANE MILLS.
APPLICATION FILED NOV. 12, 1914.

1,149,802.

Patented Aug. 10, 1915.
3 SHEETS—SHEET 1.

Fig: 1.

Witnesses:
P. F. Nagle.
H. G. Dieterich

Inventor:
Hugh Wallace Aitken.
by Wiedersheim & Fairbanks
Attorneys.

H. W. AITKEN.
PRESSURE REGULATING DEVICE FOR THE ROLLERS OF SUGAR CANE MILLS.
APPLICATION FILED NOV. 12, 1914.

1,149,802.

Patented Aug. 10, 1915.
3 SHEETS—SHEET 2.

Witnesses:
P. F. Nagle
H. G. Dieterich

Inventor:
Hugh Wallace Aitken.
by Wiedersheim Fairbanks,
Attorneys.

H. W. AITKEN.
PRESSURE REGULATING DEVICE FOR THE ROLLERS OF SUGAR CANE MILLS.
APPLICATION FILED NOV. 12, 1914.
1,149,802.
Patented Aug. 10, 1915.
3 SHEETS—SHEET 3.
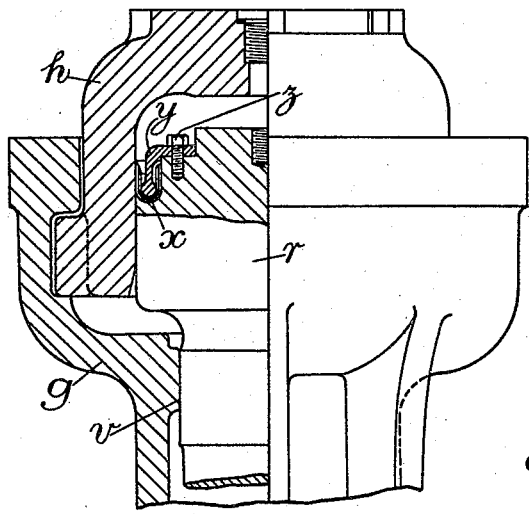
Fig: 6.
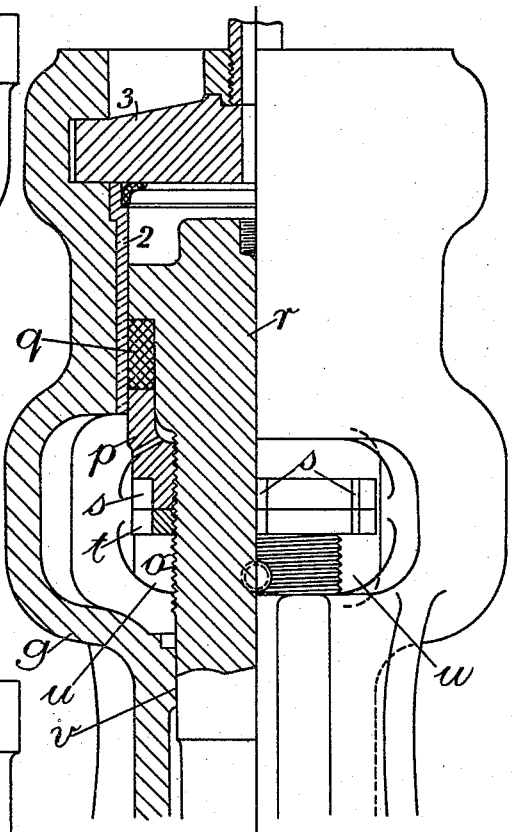
Fig: 8.
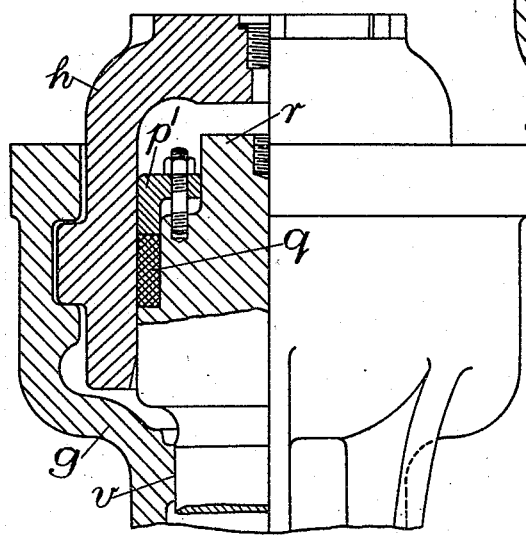
Fig: 7.
Witnesses:
P. F. Nagle
H. G. Dieterich
Inventor:
Hugh Wallace Aitken
by Wiedersheim & Fairbanks
Attorneys.

UNITED STATES PATENT OFFICE.

HUGH WALLACE AITKEN, OF GLASGOW, SCOTLAND.

PRESSURE-REGULATING DEVICE FOR THE ROLLERS OF SUGAR-CANE MILLS.

1,149,802. Specification of Letters Patent. Patented Aug. 10, 1915.

Application filed November 12, 1914. Serial No. 871,670.

*To all whom it may concern:*

Be it known that I, HUGH WALLACE AITKEN, a subject of the King of Great Britain and Ireland, residing at 147 Richmond Chambers, Bath street, Glasgow, Scotland, have invented certain new and useful Improvements in Pressure-Regulating Devices for the Rollers of Sugar-Cane Mills; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to pressure-regulating devices for the rollers of sugar cane mills.

It is common practice to employ hydraulic cylinders for controlling the pressure on the bearings of the top roller or one or both of the side rollers of sugar cane mills, these cylinders being located within the headstock caps which hold in the bearings of the hydraulically-controlled roller.

The present invention—which will be described in the following specification and more particularly defined in the annexed claims—has for its object to provide a convenient, efficient, and satisfactory arrangement of headstock cap and hydraulic cylinder, having special regard to the supporting, guiding and packing of the ram.

The headstock cap is formed with an extension within which is located the hydraulic cylinder. The cap is thus of much greater length than is usual and is formed with two guiding surfaces for the ram. These two guiding surfaces are situated a considerable axial distance apart and both are between the cylinder and the bearing controlled by the cylinder. While providing this double bearing within the cap, provision is made for obtaining access to the ram packing, or to the gland which secures the packing, without slacking the headstock bolts. The present construction has the great advantages:—(1) That the supporting and guiding of the ram are suitable for enabling it to withstand great lateral pressure applied at its lower (or roller-bearing) end. (2) The cylinder is relieved from all lateral pressure exerted on the ram. (3) The two guiding surfaces of the ram can be machined with absolute concentricity at one operation and without difficulty, so that the ram will always be guided in a perfectly straight line.

The accompanying drawings illustrate my invention.

Figure 2:
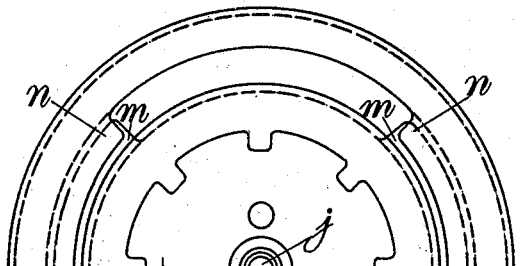
Figure 3:
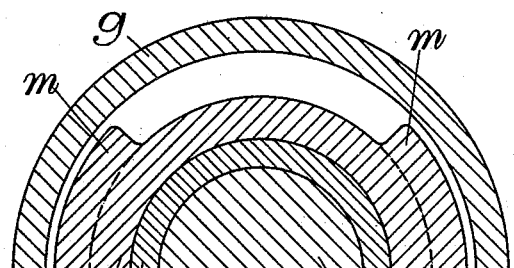
Figure 4:
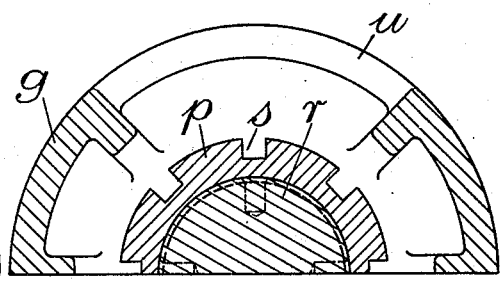
Figure 5:
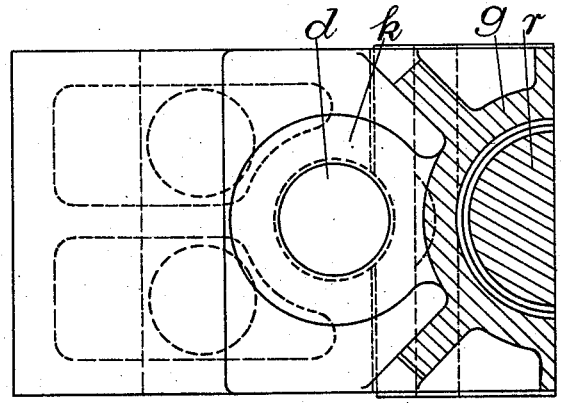

Figure 1 is, as regards its right hand portion a front elevation, and, as regards its left hand portion, a vertical section, of a top-roller headstock cap with part of the headstock and roller bearing. Fig. 2 is a half plan of the top of the same. Fig. 3 is a half horizontal section on the line A A of Fig. 1. Fig. 4 is a half horizontal section on the line B B of Fig. 1. Fig. 5 is a half horizontal section on the line C C of Fig. 1. Fig. 6 illustrates a modified construction. Fig. 7 illustrates a further modification. Fig. 8 illustrates a further modification.

Referring in the first place to Figs. 1–5, $a$ is the headstock, $c$ the headstock cap, $f$ the roller bearing, $h$ the hydraulic cylinder, and $r$ the ram. $b$ is a bolster piece inserted between the lower end of the ram and the bearing controlled by the ram; but the ram may, if desired, be arranged to act directly on the bearing.

The cap $c$ is adapted to be secured to the headstock by two or more headstock bolts. One of the bolt holes for these bolts is shown at $d$, and the position of the nut on the top end of the bolt is indicated by chain lines at $e$. The cap is formed with a "crown" or extension piece $g$ which contains the hydraulic cylinder. The term "crown" will hereinafter be used to denote that portion of the cap which projects beyond the surfaces $k$, $k$ on which the headstock nuts rest.

The cylinder is adapted to be inserted in the cap from the top or outside end of the latter, and to be secured in the cap in a convenient manner adequate to withstand the axial thrust exerted on it when in action. The method of attachment shown in the drawings is of the bayonet-joint type. The cylinder is provided with lugs $m$, $m$, and the hole in the top of the crown is provided with two inward projections $n$, $n$. The cylinder, after being introduced by an axial movement into the hole in the crown, is given a rotary movement—say through 90°—so as to bring the lugs $m$, $m$ under the projections $n$, $n$. Fluid under pressure is admitted to the cylinder by the hole $j$ into which a pipe may be screwed.

The ram is threaded at $o$ to receive a gland $p$ which is internally threaded and screwed on to the ram so as to compress packing $q$ (of the compressible or stuffing box type) which is located within a stuffing box provided in the ram. The lower end of the gland is provided with grooves $s$, $s$ which enable the gland to be gripped and rotated by a wrench or spanner. $t$ is a locking nut. Holes $u$ are provided at the sides of the crown opposite the gland, or the lower part of the gland, so as to allow access to the gland and room for manipulating the same without interfering with the headstock cap or the hydraulic cylinder. The gland can, in fact, be tightened up while the mill is at work.

Guides or bearing surfaces for the ram, $v$, $v'$, are formed in the interior of the cap. these surfaces being situated a considerable axial distance apart. The upper of these surfaces is situated within the crown, while the lower one may either be within the crown or within the base part of the cap. As the ram rises and falls due to variations in the pressure exerted by the roller on the bearing, these surfaces guide the ram and withstand any lateral pressure on it so that no lateral pressure is exerted on the cylinder, and the latter has to bear no pressure except the hydraulic pressure within it. Clearances $w$, $w$ of any desirable amount may be allowed between the cylinder and the cap so that the cylinder can automatically accommodate itself to suit the ram by a lateral movement of adjustment.

In the modified construction shown in Fig. 6 a U leather $x$ is employed to pack the ram in place of compressible packing. This U leather is held in place by an L ring $y$ which is secured to the top of the ram by screwed pins or studs $z$. There is no gland such as the gland $p$ shown in Figs. 1-5 and it is unnecessary to provide holes $u$ in the crown. To insert a new U leather, it is necessary to withdraw the hydraulic cylinder. It is not necessary to withdraw the ram. The ram is, as before, guided in the cap in two places situated a considerable axial distance apart, this being an essential feature of my invention. The upper guide place is indicated at $v$. The lower part of the ram and cap are, or may be, the same as shown in Fig. 1.

Fig. 7 shows a construction the same as that shown in Fig. 6, except that compressible packing $q$ is employed in place of a U leather. This packing is compressed by a gland $p'$ which is bolted (but might be screwed) on to the ram. Access to the gland and packing is obtained by removing the hydraulic cylinder.

It has been mentioned in the early part of this specification that the hydraulic cylinder is contained within the crown. It does not necessarily follow that the cylinder is completely inclosed by the crown. A part of the cylinder may project beyond the crown as shown in Figs. 1, 6 and 7, this being a matter of convenience in the design. Moreover, instead of the cylinder being formed as a separate member from the crown, the latter may be bored to form the hydraulic cylinder and may, or may not, be provided with a liner. The cover of the cylinder must then be removable. This latter construction is illustrated in Fig. 8. The cylinder is provided with a liner 2 and with a removable cap 3.

Fig. 8 is shown with a gland $p$ to which access can be had through holes $u$ as in Fig. 1. The construction shown in Fig. 8 could, however, be modified on the lines indicated by Figs. 6 and 7; that is to say, the packing—whether leather or compressible packing—could be located at the top of the ram and access to this packing obtained by removing the cover of the cylinder.

The constructions illustrated in Figs. 1–8 have been designed for use on headstock caps of top roller bearings and have been described accordingly. The same constructions could, however, be employed on the caps of the side roller bearings without involving any alteration affecting my invention.

When a construction such as that shown in Figs. 1-5 is employed with a gland $p$ accessible through holes $u$ in the crown, this gland may be screwed either to the ram (as shown) or to the cylinder. The former construction is, in my opinion, generally preferable.

An important feature of my invention is the fact that its employment does not necessitate the use of longer headstock bolts than are usually employed in a mill in which no hydraulic cylinders are employed. For example, in Fig. 1, the height of the cap up to the surfaces $k$ is not any greater than would be the case in a cap having no hydraulic cylinder. My invention could, therefore, be applied to existing mills by providing these with new caps, the existing headstock bolts being still used. This is an important consideration as, with large mills, the cost of new head stock bolts is a serious matter.

Having thus described my invention, what I claim as new and desire to secure by Letters Patent is:—

1. In a sugar cane mill, in combination, a headstock carrying a roller bearing, a headstock cap adapted to retain said bearing, headstock bolts adapted to pass through said headstock cap and to hold said cap down on said headstock, a crown formed on said headstock beyond the ends of said bolts, an hydraulic cylinder within said crown, means for supplying fluid under pressure to said cylinder, and a ram adapted to slide in said cylinder under the action of said fluid pressure and to regulate the pressure on said bearing, the said cap—which includes the crown—being provided with two surfaces adapted to act as guides for said ram, the upper of said surfaces being situated within said crown and said surfaces being situated a considerable axial distance apart and adapted to support the said ram against lateral pressure.

2. In a sugar cane mill, in combination, a headstock carrying a roller bearing, a headstock cap adapted to retain said bearing, headstock bolts adapted to pass through said headstock cap and to hold said cap down on said headstock, a crown formed on said headstock beyond the ends of said bolts, an hydraulic cylinder secured within said crown in a manner adapted to allow of its automatic lateral adjustment, means for supplying fluid under pressure to said cylinder, a ram adapted to slide in said cylinder under the action of said fluid pressure and to regulate the pressure on said bearing, the said cap—which includes the crown—being provided with two surfaces adapted to act as guides for said ram, the upper of said surfaces being situated within said crown and said surfaces being situated a considerable axial distance apart and adapted to support the said ram against lateral pressure.

3. In a sugar cane mill, in combination, a headstock carrying a roller bearing, a headstop cap adapted to retain said bearing, headstock bolts adapted to pass through said headstock cap and to hold said cap down on said headstock, a crown formed on said headstock beyond the ends of said bolts, an hydraulic cylinder within said crown, means for supplying fluid under pressure to said cylinder, a ram adapted to slide in said cylinder under the action of said fluid pressure and to regulate the pressure on said bearing, packing for said ram within said cylinder, and a gland screwed to said ram and adapted to retain said packing, the said cap—which includes the crown—being provided with two surfaces adapted to act as guides for said ram, the upper of said surfaces being situated within said crown and said surfaces being situated a considerable axial distance apart and adapted to support the said ram against lateral pressure, and the said cap being provided with holes in its sides adapted to allow of access to said gland for adjustment thereof.

4. In a sugar cane mill, in combination, a headstock carrying a roller bearing, a headstock cap adapted to retain said bearing, headstock bolts adapted to pass through said headstock cap and to hold said cap down on said headstock, a crown formed on said headstock beyond the ends of said bolts, an hydraulic cylinder within said crown, means for supplying fluid under pressure to said cylinder, a ram adapted to slide in said cylinder under the action of said fluid pressure and to regulate the pressure on said bearing, packing for said ram within said cylinder, and an adjustable gland adapted to retain said packing, the said cap—which includes the crown—being provided with two surfaces being situated a considerable axial ram, the upper of said surfaces being situated within said crown and said surfaces being situated a considerable axial distance apart and adapted to support the said ram against lateral pressure, and the said cap being provided with holes in its sides adapted to allow of access to said gland for screwing it up.

In testimony whereof I have signed my name to this specification in the presence of two subscribing witnesses.

HUGH WALLACE AITKEN.

Witnesses:
GEORGE TAYLOR,
JAMES SHEARER.

Copies of this patent may be obtained for five cents each, by addressing the "Commissioner of Patents, Washington, D. C."